US012574251B2

(12) United States Patent
Chen

(10) Patent No.: US 12,574,251 B2
(45) Date of Patent: Mar. 10, 2026

(54) BLOCKCHAIN-BASED PLATFORM-INDEPENDENT PERSONAL PROFILES

(71) Applicant: TYNTRE, LLC, Irvine, CA (US)

(72) Inventor: Thomas Chen, Irvine, CA (US)

(73) Assignee: TYNTRE, LLC, Irvine, CA (US)

( * ) Notice: Subject to any disclaimer, the term of this patent is extended or adjusted under 35 U.S.C. 154(b) by 99 days.

(21) Appl. No.: 18/742,305

(22) Filed: Jun. 13, 2024

(65) Prior Publication Data

US 2025/0226990 A1     Jul. 10, 2025

Related U.S. Application Data

(60) Provisional application No. 63/618,531, filed on Jan. 8, 2024.

(51) Int. Cl.
*H04L 9/32* (2006.01)
*H04L 9/40* (2022.01)

(52) U.S. Cl.
CPC .......... *H04L 9/3247* (2013.01); *H04L 9/3213* (2013.01); *H04L 63/0861* (2013.01)

(58) Field of Classification Search
CPC . H04L 9/3247; H04L 9/3213; H04L 63/0861; H04L 9/3231; H04L 9/3239; H04L 9/50
See application file for complete search history.

(56) References Cited

U.S. PATENT DOCUMENTS

| | | | | |
|---|---|---|---|---|
| 2020/0145219 A1* | 5/2020 | Sebastian | .................. | H04L 9/50 |
| 2020/0274713 A1* | 8/2020 | Li | .......................... | H04L 9/3221 |
| 2021/0273931 A1* | 9/2021 | Murdoch | .............. | H04L 9/3239 |
| 2022/0385476 A1* | 12/2022 | Murdoch | .............. | H04L 63/126 |
| 2025/0054087 A1* | 2/2025 | Schwartz | ............. | G06Q 50/265 |

* cited by examiner

*Primary Examiner* — Henry Tsang
(74) *Attorney, Agent, or Firm* — Haynes and Boone, LLP

(57) ABSTRACT

Methods and systems are presented for using blockchain technologies to establish and manage personal profiles for users. A credential system registers a user by generating a token associated with a blockchain for the user, and storing authentication data associated with the user in the blockchain. The authentication data may include encoded data that represents an identification document and biometric data. After registering the user with the credential system, a verifier device can authenticate the user via the credential system using the authentication data stored on the user device. Additional information, such as interaction data associated with the user's interaction with various computer system can be added to the blockchain using the token generated for the user. The interaction data of the user with various computer systems, collectively, forms a universal personal profile of the user, and can be used by the various computer systems to manage the user.

20 Claims, 8 Drawing Sheets

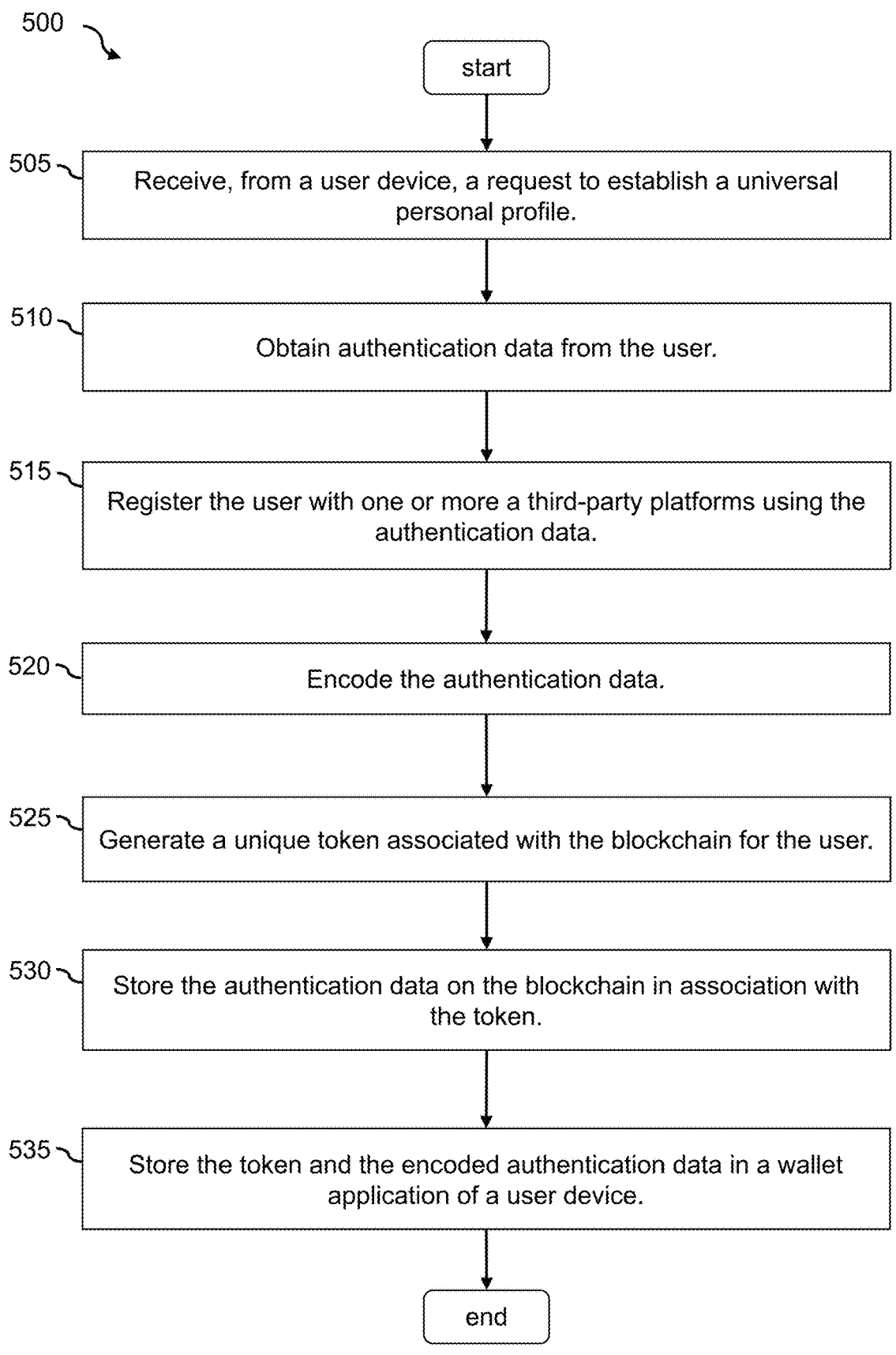

500 start

505 Receive, from a user device, a request to establish a universal personal profile.

510 Obtain authentication data from the user.

515 Register the user with one or more a third-party platforms using the authentication data.

520 Encode the authentication data.

525 Generate a unique token associated with the blockchain for the user.

530 Store the authentication data on the blockchain in association with the token.

535 Store the token and the encoded authentication data in a wallet application of a user device.

end

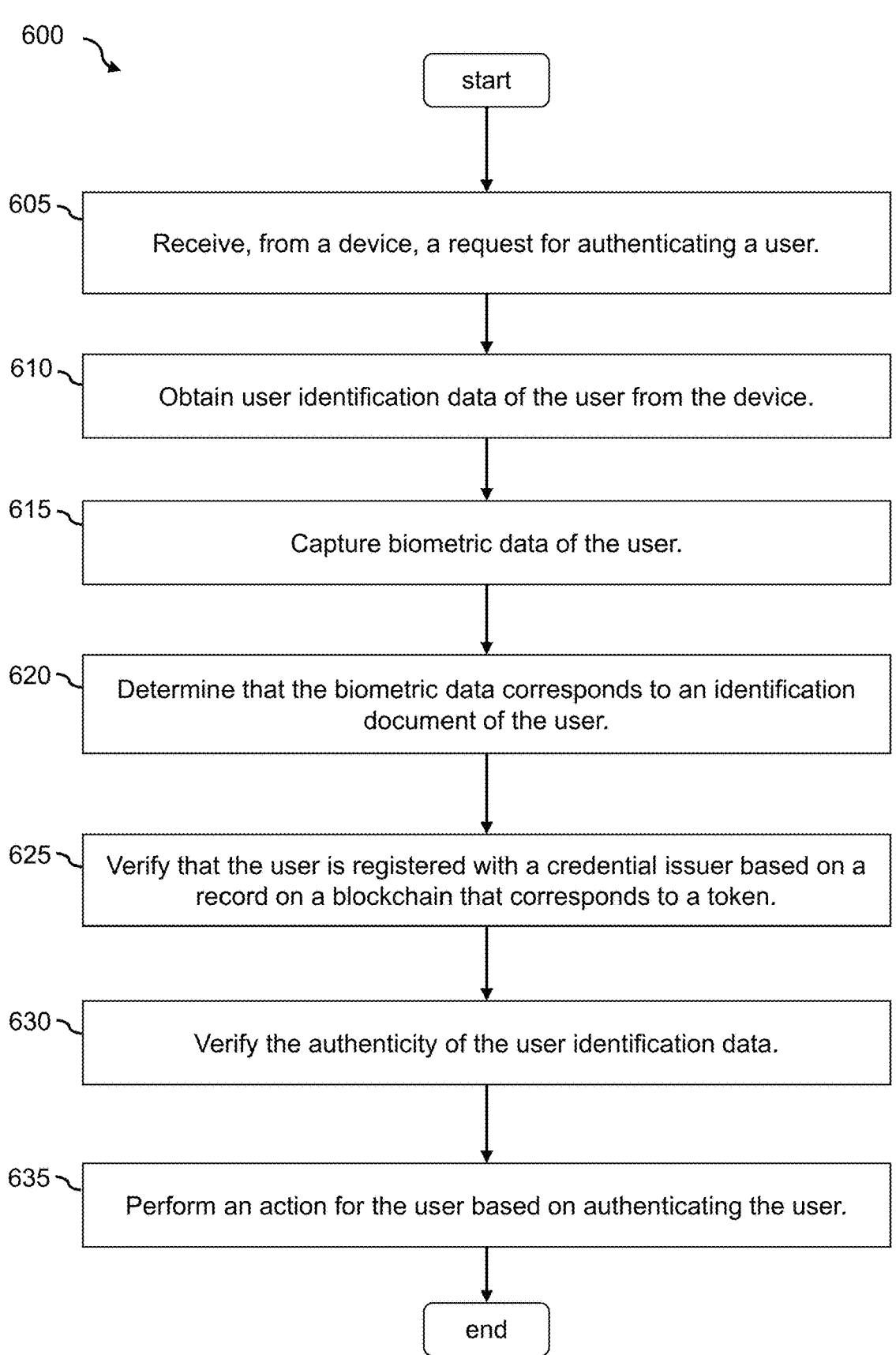

start

605 — Receive, from a device, a request for authenticating a user.

610 — Obtain user identification data of the user from the device.

615 — Capture biometric data of the user.

620 — Determine that the biometric data corresponds to an identification document of the user.

625 — Verify that the user is registered with a credential issuer based on a record on a blockchain that corresponds to a token.

630 — Verify the authenticity of the user identification data.

635 — Perform an action for the user based on authenticating the user.

end

Figure 6

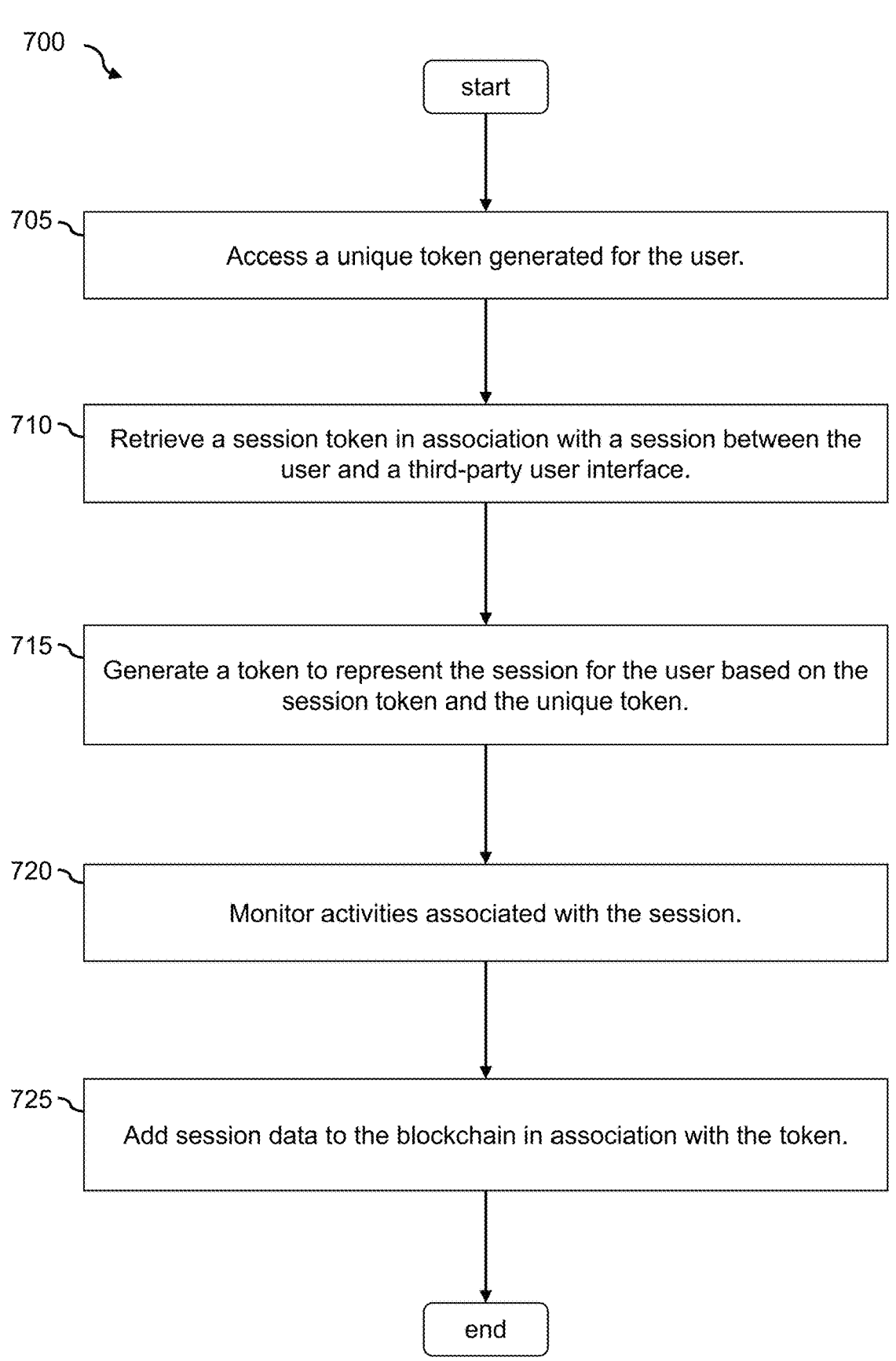

700 start

705 Access a unique token generated for the user.

710 Retrieve a session token in association with a session between the user and a third-party user interface.

715 Generate a token to represent the session for the user based on the session token and the unique token.

720 Monitor activities associated with the session.

725 Add session data to the blockchain in association with the token.

end

Figure 7

BLOCKCHAIN-BASED PLATFORM-INDEPENDENT PERSONAL PROFILES

CROSS REFERENCE TO RELATED APPLICATION

The present application claims priority to U.S. Provisional Patent Application Ser. No. 63/618,531, filed Jan. 8, 2024, which is incorporated herein by reference in its entirety.

BACKGROUND

The present specification generally relates to user authentication, and more specifically, to providing a blockchain-based framework for facilitating computer platform-independent user authentication according to various embodiments of the disclosure.

RELATED ART

Conventionally, online personal profiles are managed centrally by various platforms. For example, once a user registers an account with an online platform (e.g., an online merchant, an online forum, an online marketplace, etc.), the user may create and/or establish a personal profile unique to the user. The personal profile may include personal information such as a name of the user, an account number established by the service provider, credentials for accessing the account, and historic activities and/or interactions that the user had with the online platform associated with the service provider (e.g., data that the user has posted and/or uploaded to the online platform, interactions conducted by the user such as a browsing history, historic transactions conducted by the user via the online platform, etc.).

Such a personal profile can be useful as the user interacts with the online platform and/or other users of the online platform. For example, based on the user's transaction history, the online platform may have a stronger trust (or a weaker trust, depending on the transaction history) with the user when the user conducts future transactions with the online platform. In addition, other users may also access the user's personal profile as a reference when conducting interactions and/or transactions with the user via the online platform (e.g., buying and/or selling items, conducting an online discussion on a topic, etc.).

However, since these online personal profiles are managed centrally by the corresponding platforms and they are not shared by the different platforms, users have to establish different personal profiles with each individual platform. For example, even though a user has conducted numerous legitimate transactions via a first online platform, the transaction history does not carry over to a second online platform. To the second online platform and users of the second online platform, the user will appear as a new user with no prior interactions and/or transaction history, which may hinder the way that the second online platform and/or the users of the second online platform interact with the user and vice versa. As such, there is a need to provide a framework that enables personal profiles to be shared among various platforms.

BRIEF DESCRIPTION OF THE FIGURES

FIG. 5 illustrates a process for establishing a platform-independent personal profile for a user according to an embodiment of the present disclosure;

FIG. 6 illustrates a process of authenticating a user using a blockchain according to an embodiment of the present disclosure; and FIG. 7 illustrates a process of adding data to a platform-independent personal profile according to an embodiment of the present disclosure.

Figure 1:
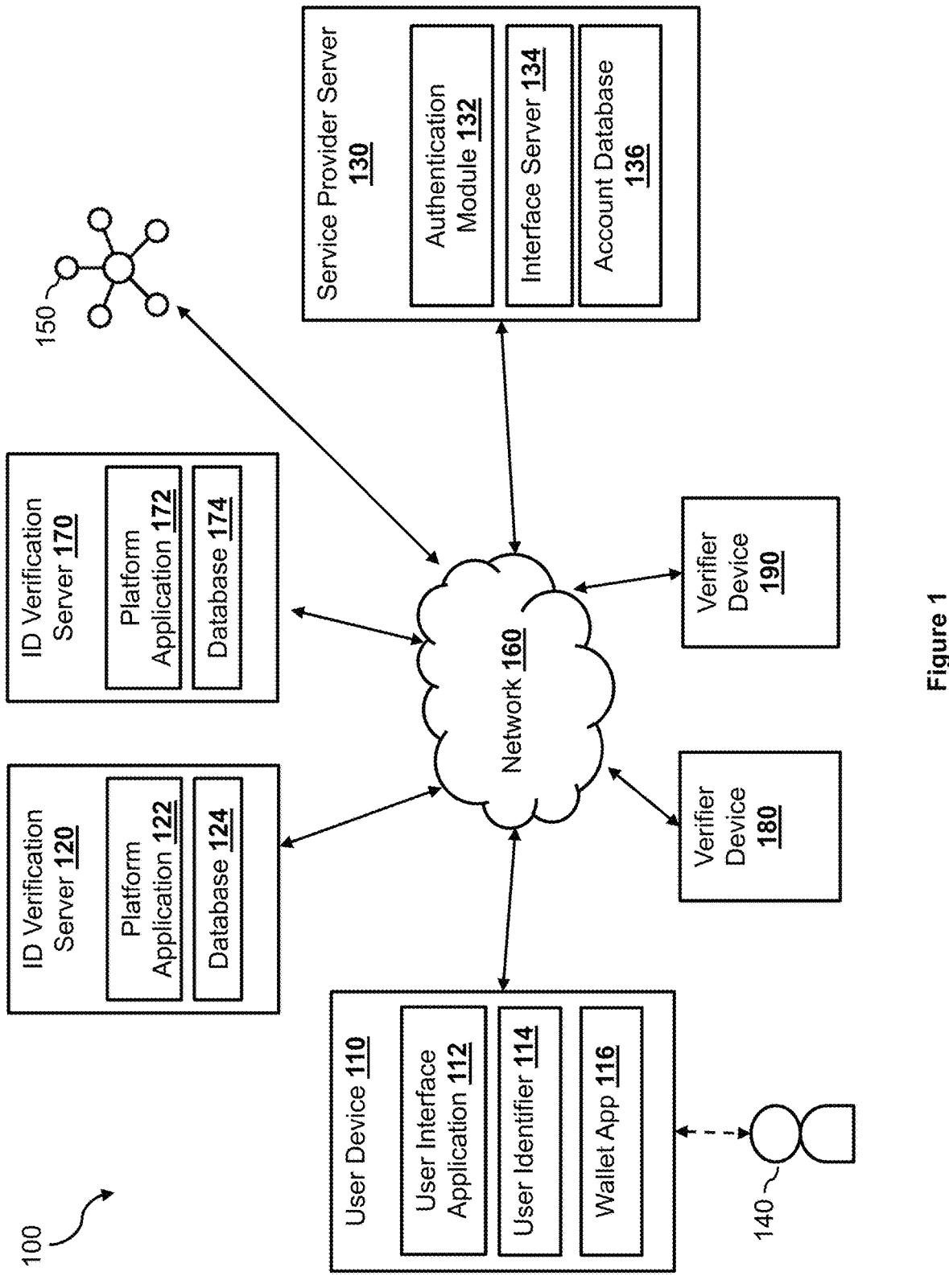
FIG. 1 is a block diagram illustrating a networked system that includes an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for providing a framework that establishes and maintains platform-independent personal profiles (also referred to as "universal personal profiles" or simply "personal profiles") using a blockchain. Using the framework, users may establish corresponding personal profiles by interacting with a service provider server associated with a credit issuer. Unlike profiles that are specific to a particular platform, the platform-independent personal profiles that are established and maintained under the framework can be used across different platforms. The profiles can also be used to provide universal authentication services for authenticating users, and manage user interactions with different computer systems, as will be explained in more details below.

When a user registers with the service provider server (which is associated with a credential issuer), the service provider server may generate, for the user, a unique token that corresponds to a blockchain (e.g., minting a token for the user). The unique token may be linked to a personal profile associated with the user. In some embodiments, the service provider server may provide (or use one or more third-party services, such as CLEAR®, Incode®, etc., to provide) a workflow for registering the user. The workflow may require the user to provide an identification document (e.g., a government issued document such as a driver's license, a passport, etc.) and biometric data (e.g., a fingerprint scan of the user, an image of a face of the user, an iris scan of the user, an electrocardiogram of the user, etc.) for establishing a user account. For example, service provider server may communicate with a user device of a user to capture one or more images of the identification document and the biometric data. In some embodiments, the service provider server may also generate a private key/public key pair for the user.

In some embodiments, the service provider server may initiate a workflow of a first third-party service (e.g., CLEAR®, etc.) by transmitting an application programming interface (API) call to a server associated with the first third-party service. As discussed herein, the user may be prompted to provide photos of an identification document and biometric data during the workflow. A first server of the first third-party service may return a success signal after successfully registering the user with the first third-party service (or a fail signal if the user fails to register with the first third-party service). Based on the success signal, the service provider server may generate encoded data based on the identification document. For example, the service provider server may extract information from the identification document, such as a name, a date of birth, a photo, a document number, an expiration date, etc. The service provider server may apply an encoding technique (e.g., a Base64 encoding technique, etc.) to the extracted information to generate the encoded data. In a non-limiting example, data extracted from an identity document may include: "{'fullName': 'John Doe', 'dateOfBirth': '1990-01-1', 'idNumber': 'D1234567'}". Encoding the data in a Base64 encoding technique may generate encoded data: "eyJmdWxsTmFtZSI6ICJKb2huIERvZSIsICJkYX RIT2ZCaXJ0aCI6ICIxOTkwLTAxLTAxliwg ImlETnVtYmVyIjogIkQxMjM0NTY3In0="

The service provider server may store a record that includes the encoded data (or a hashed version of the encoded data) and the biometric data on the blockchain in association with the unique token generated for the user, such that the encoded identification document and the biometric data will be linked to the user on the blockchain. The record may become a part of the universal personal profile of the user.

After registering the user with the first third-party service, the service provider server of some embodiments, may proceed with registering the user with one or more other third-party services. For example, the service provider server may use the encoded data and the biometric data of the user to register the user with a second third-party service (e.g., Incode®, etc.) by transmitting API calls that include the encoded data and the biometric data to a second server associated with the second third-party service. Since these third-party services typically work independently and separately from each other, a user who is registered with one third-party service cannot be authenticated by another third-party service. A verifier (which is an entity that is required to verify an identity of a user, such as immigration services at entry ports, hospitals, banks, stores that sell restricted items such as cigarettes, alcohol, devices that offer restricted services such as electronic vaping devices, etc.) may decide to use a particular third-party service for verifying an identity (and also attributes, such as an age, etc.). By registering the user with different (or all of the) third-party services, the service provider server enables the user to be authenticated by any verifier using any of the third-party services.

In some embodiments, after registering the user, the service provider server may also store the encoded data and the token of the user in a native wallet application (e.g., Apple Wallet®, Google Wallet®, etc.) of a user device of the user, for example, as a new computer-based object in the native wallet application. The newly created object in the native wallet application can be viewed as an identity document for the user. Unlike an actual identity document (e.g., storing a driver's license in the native wallet, etc.), this native wallet object can allow the user to be securely authenticated via an electronic authentication workflow (e.g., an authentication workflow associated with the service provider server, authentication workflows associated with third-party services, etc.). In some embodiments, in order to prevent unauthorized access/usage of the encoded data and the token, the service provider server may also generate a digital signature for the user (e.g., by encrypting the encoded data using a private key generated and/or assigned to the user, etc.), and store the digital signature along with the encoded data and the token in the native wallet application. The digital signature may serve as an additional security measure during the authentication process for the user.

In some embodiments, since the service provider server has all of the required information about the users, and can facilitate the authentication process with different third-party services, the verifiers (e.g., different merchants, different devices, etc.) can authenticate users directly via the service provider server, instead of authenticating users via different third-party services. For example, a user may initiate an authentication process with a verifier (e.g., by interacting with a user interface of a verifier's device, by using the user device of the user to interact with the verifier's device, etc.). In some embodiments, the verifier device may establish a communication channel (e.g., a short-range wireless communication channel, such as a Bluetooth® communication channel, a near-field communication (NFC) communication channel, etc.) with the user device of the user. The verifier device may be associated with an entity (e.g., a government entity, a merchant, a service provider, etc.), that includes components (e.g., computer hardware components, computer software components, etc.) for facilitating an authentication workflow with the service provider server.

After establishing the communication channel, the verifier device may retrieve authentication data associated with the user. For example, if the encoded data, the token, and the digital signature is stored as an object in the native wallet application of the user device, the verifier device may retrieve the item from the user device using a protocol corresponding to the native wallet application (e.g., using an NFC reader, etc.). In some embodiments, the verifier device may also include one or more sensors (e.g., an image sensor, etc.) and may capture biometric data of the user at the time of performing the authentication process. The verifier device may then transmit the retrieved information (e.g., the encoded data, the digital signature, the token, etc.) and the captured biometric data to the service provider server.

Upon receiving an authentication request from the verifier device, the service provider server may first verify that the token was generated for a legitimate registered user. For example, the service provider server may traverse the blockchain and access one or more records associated with the token. If the token was generated for a registered user, the service provider server would be able to identify a record that includes the information recorded on the blockchain during the registration process of the user (e.g., the encoded data, the biometric data, etc.). The service provider server may then verify that the encoded data stored on the blockchain, which represents the identification document of the user, corresponds to the encoded data received from the verifier device. For example, the service provider server may generate a hash value by performing a hash function on the encoded data received from the user device, and may compare the hashed value against the data stored in the blockchain. In some embodiments, the service provider server may also compare the biometric data stored on the blockchain against the biometric data captured by the verifier device to verify that the biometric data captured by the verifier device belongs to the user who has been registered with the service provider server and corresponds to the encoded data.

In some embodiments, to further improve the security of the authentication process, the service provider server may also verify that the digital signature corresponds to the user. For example, the service provider server may also retrieve, from the record associated with the user and stored on the blockchain, a public key generated for and associated with the user. The service provider server may attempt to decrypt the digital signature received from the verifier device using the public key. If the digital signature is successfully decrypted using the public key, and that the decrypted data matches the encoded data, the service provider server may determine that the digital signature is verified. In some embodiments, the service provider server may store a record of authentication on the blockchain (in association with the token generated for the user) every time an electronic authentication process is performed for the user. As such, the blockchain may include records of all of the previous authentications performed for the user. In some embodiments, the service provider server may determine whether the authentication process being performed for the user is consistent with the previous authentication processes performed for the user. For example, if a previous authentication process was performed by the U.K. immigration service that enabled the user to enter into U.K. an hour ago, an authentication process for enabling the user to enter into a hospital in the U.S. would be inconsistent. On the other hand, if a previous authentication process was performed by the U.K. immigration service that enabled the user to enter into U.K. an hour ago, an authentication process for enabling the user to enter into a hospital in the U.K. would be consistent.

In some embodiments, the digital signature may be re-generated after each time the user has been authenticated by the service provider server. For example, the service provider server may maintain a counter for each user (e.g., initialized as '0'). The service provider server may generate a digital signature for the user by encrypting the counter (or the encoded data with the counter) using the private key associated with the user. The counter may be stored on the blockchain (e.g., as part of the records associated with the registration and each authentication process for the user). When the user is successfully authenticated by the service provider server, the service provider server may increment the counter by '1', and store the updated counter as part of the record associated with the authentication process. The service provider server may re-generate the digital signature for the user using the updated counter, and may replace the digital signature in the native wallet application of the user device with the newly generated digital signature. As such, as part of the authentication process, after decrypting the digital signature received from the verifier device, the service provider server may verify that the counter from the digital signature is consistent with the counter stored on the blockchain (e.g., the counter in the most recent authentication record associated with the user, etc.). This mechanism prevents an unauthorized access of the user's encoded data by someone else.

In some embodiments, in addition to verifying the digital signature, the service provider server may send a challenge to the user device via the verifier device. For example, if it is determined that the authentication request is inconsistent with a previous authentication request, the service provider server may require the user device to respond to an additional challenge. The challenge may include seed data that is dynamically generated by the service provider server, and require the user device to sign (e.g., encrypt) the seed data using the private key assigned to the user. The user device may sign the seed data and return the signed seed data back to the service provider server. The service provider server can verify that the user device has possession of the private key of the user by attempting to decrypt the signed seed data using a public key associated with the user.

After verifying the authenticity of the encoded data, the biometric data, and the digital signature, the service provider server may determine that the user is authenticated, and may transmit an authentication success signal to the verifier device. Depending on the nature of the verifier device, one or more actions can be performed for the user after the user is authenticated. For example, if the verifier device is associated with a physical facility (e.g., an entry port of a country, a hospital, etc.), the one or more actions may include unlocking or opening a barrier (e.g., a gate, a door, etc.). If the verifier device is configured to provide a service to the user, the one or more actions may include enabling the device to provide the service to the user.

In some embodiments, if the verifier device is part of an online platform that provides services and/or interacts with the user, the one or more actions may include providing the user access to data/services/functionalities associated with the online platform based on the authentication. In some embodiments, the service provider server may also track the activities of the user with the online platform after the user has been authenticated. For example, as the user accesses the third-party platform (e.g., an online merchant site, an online forum, an online marketplace, etc.), the third-party platform may establish an online session with the user, and may associate a session token with the online session. In some embodiments, the third-party platform may transmit the session token to the service provider server, which may trigger the authentication process associated with the service provider server. For example, the service provider server may receive authentication data (e.g., biometric data such as an image of the user, a fingerprint, etc.) via a user interface of the third-party platform. The service provider server may then compare the biometric data received via the third-party platform against the biometric data stored by the service provider server for the user. Based on a result of the authentication workflow, the service provider server may identify the token associated with a personal profile of the user.

In some embodiments, after authenticating the user and retrieving the personal profile of the user, the service provider server may combine the token associated with the user with the session token (e.g., append the token associated with the user's personal profile to the session token) to generate a combined token, and return the combined token to the third-party platform. The transmission of the combined token to the third-party platform may indicate to the third-party platform that the user has been authenticated, and the user is associated with a personal profile that can be identifiable using the token of the user.

The third-party platform may then allow the user to interact and/or perform transactions (e.g., upload content, conduct payment transactions, conduct purchase transactions, interact with content associated with others, etc.) via the third-party platform. The third-party platform may record interactions and/or transactions conducted by the user on the blockchain using the combined token. In some embodiments, the third-party platform may access historic interactions and/or transactions conducted by the user with the third-party platform or other third-party platforms that have been recorded by the various third-party platforms on the blockchain using the user's token. The historic interactions and/or transactions conducted by the user with various third-party platforms that have been recorded on the blockchain may constitute the personal profile or a part of the personal profile of the user. In some embodiments, the third-party platform may perform one or more actions based on the personal profile of the user.

For example, the third-party platform may adjust a security process when the user conducts a transaction via the third-party platform. In particular, when the user has a history of performing legitimate transactions with other third-party platforms in the past, the third-party platform may provide a less stringent security requirements and/or workflow for the user when the user conducts a transaction via the third-party platform. In some embodiments, the third-party platform may indicate to other users who wish to conduct transactions with the user that the user has a positive transaction history. On the other hand, when the user has a history of performing one or more fraudulent transactions with other third-party platforms in the past, the third-party platform may provide a more stringent security requirements and/or workflow for the user when the user conducts a transaction via the third-party platform (or may deny the transaction). In some embodiments, the third-party platform may also indicate to other users who wish to conduct transactions with the user that the user has a negative transaction history.

In another example, the third-party platform may provide an indication indicating a trustworthiness for content uploaded by the user. In particular, if the user has established a credential for having knowledge in a particular topic based on the user's past content on various third-party platforms, the third-party platform may provide an indication indicating the user's knowledge level on a particular topic when the user provide content on that particular topic.

FIG. 1 illustrates a networked system 100, within which the framework may be implemented according to one embodiment of the disclosure. Note that the present techniques may be applied in many different computing and technological environments, however, and are not limited to those shown in the figures. The networked system 100 includes a service provider server 130, identity verification servers 120 and 170, a user device 110 associated with a user 140, and verifier devices 180 and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by the user 140 to interact with the identity verification servers 120 and 170, the verifier devices 180 and 190, and/or the service provider server 130 over the network 160. For example, the user 140 may use the user device 110 to interact with one or more of the identity verification servers 120 and/170 (e.g., to register an account with the identity verification servers 120 and 170, etc.). Additionally or alternatively, the user 140 may also interact with the service provider server 130 to register an account with the service provider server 130. By registering an account with the service provider server 130, the service provider server 130 of some embodiments may automatically use the credential information to register the user with the identity verification servers 120 and 170. The user 140 may also interact with the verifier devices 180 and 190. For example, as the user 140 attempts to access an area or a service provided by an entity (e.g., a country, a website, a merchant, an appliance, etc.), the associated verifier device (e.g., the verifier device 180 and/or the verifier device 190, etc.) may interact with the user device 110 and the service provider server 130 to perform an electronic authentication process for the user.

The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile application, etc.), which may be utilized by the user 140 to interact with the identity verification servers 120 and 170, the verifier devices 180 and 190, and/or the service provider server 130 over the network 160. In one implementation, the UI application 112 includes a software program (e.g., a mobile application) that provides a graphical user interface (GUI) for the user 140. In another implementation, the UI application 112 includes a browser module that provides a network interface to browse information available over the network 160. For example, the UI application 112 may be implemented, in part, as a web browser to view information available over the network 160.

The user device 110, in one embodiment, may include at least one identifier 114, which may be implemented, for example, as operating system registry entries, cookies associated with the UI application 112 and/or the wallet application 116, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user 140 with a particular user account, a particular digital wallet, and/or a particular profile.

The user device 110 also includes a wallet application 116 configured to store data associated with various documents of the user (e.g., credit cards, debit cards, gift cards, a driver's license, a passport, etc.) and to communicate with other devices (e.g., point-of-sale devices (not shown, the verifier devices 180 and 190, etc.) to facilitate various transactions, such as purchase transactions, authentication transactions, for the user.

In various implementations, the user 140 is able to input data and information into an input component (e.g., a keyboard) of the user device 110. For example, the user 140 may use the input component to interact with the UI application 112 (e.g., to retrieve content from third-party servers such as the merchant server 120, to provide inputs related to a cryptocurrency transaction to the service provider server 130, etc.).

While only one user device 110 is shown in FIG. 1, it has been contemplated that multiple user devices can be included in the networked system 100. Each of the user devices may include similar hardware and software components as the user device 110 to enable their respective users to interact with identity verification servers 120 and 10, the verifier devices 180 and 190, and/or the service provider server 130.

Each of the identity verification servers 120 and 170 may be associated with a third-party identity verification service providers (e.g., CLEAR®, Incode®, etc.) that is configured to provide user authentication services using a respective proprietary platform. For example, the user 140 may register an account with the identity verification server 120 by using the user device 110 to interact with the platform application 112. Through the registration process, the platform application 112 may request the user for certain information (e.g., photos of an identification document, a biometric scan, etc.). Upon obtaining the information from the user 140, the platform application 112 may create an account for the user 140 and stores all of the information associated with the user in a database 124. After registered with the identity verification server 120, the user 140 may then be authenticated with any verifier devices (e.g., the verifier device 180, the verifier device 190, etc.) that use the authentication service provided by the identity verification server 120. The user 140 may also register with the identity verification server 170 using the same techniques as described herein. For example, the user 140 may use the user device 110 to interact with the platform application 172. The user 140 may transmit the necessary information to the platform application 172, which will be stored in a database 174.

Each of the verifier devices 180 and 190 may be associated with an entity that provides restricted services to users. For example, the verifier devices 180 and 190 may be associated with an immigration service of a country, a restricted facility (e.g., a hospital, a court, etc.), an appliance that provides restricted services to users (e.g., electronic vaping devices, etc.), or other types of entities. Each of the verifier devices 180 and 190 may provide authentication services for the associated entity via the identity verification server 120, the identity verification server 130, and/or the service provider server 130. For example, each of the verifier devices 180 and 190 may interact with the user device 110 and/or other user devices to retrieve and/or capture data necessary for authenticating a user. The verifier device may then communicate the data with the identity verification server 120, the identity verification server 130, and/or the service provider server 130 to perform the electronic authentication process for the user.

The service provider server 130, in one embodiment, may be maintained by a service provider that provides platform-independent personal profiles. The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various services provided by the service provider server 130 (. The interface server 134 may also include other electronic pages associated with the different services (e.g., onboarding services for establishing a personal profiles, etc.) offered by the service provider server 130. As a result, a user (e.g., the user 140, users of the user devices 180 and 190, or a merchant associated with the merchant server 120, etc.) may access a user account associated with the user and access various services offered by the service provider server 130, by generating HTTP requests directed at the service provider server 130.

The service provider server 130, in one embodiment, may be configured to maintain one or more user accounts in an account database 136 and/or a blockchain 150, each of which may be associated with a profile and may include account information associated with one or more individual users (e.g., the user 140 associated with user device 110, etc.). The account information may include a token generated by the service provider server 130 and that is unique to each user. In one implementation, a user may have credentials to authenticate or verify identity with the service provider server 130 and/or a third-party identity verification service such as CLEAR®. Thus, the service provider server 130 may store the credentials of the users in corresponding records of the account database 136 and/or the blockchain 150 associated with the user accounts. The credential data associated with each user may include digital copies (e.g., one or more images, etc.) of an identity document (e.g., a driver's license, a passport, etc.) (or an encoded version of the document), biometric data (e.g., a fingerprint, data associated with an image of the user's face, data associated with an image of an iris, etc.), and/or a digital signature.

It has been contemplated that due to the incompatibility between different third-party identity verification service providers, even after the user 140 has registered with one third-party identity verification service provider, the user cannot be authenticated using another third-party identity verification service provider. For example, if the user 140 has registered with the identity verification server 120, the user 140 may be authenticated by the verifier device 180 if the verifier device 180 is configured to perform electronic authentication services via the identity verification server 120. However, the user 140 would not be authenticated by the verifier device 190 if the verifier device 190 is configured to perform electronic authentication services via the identity verification server 170. Such incompatibility hinders the way that users can access various services or locations.

As such, in various embodiments, the service provider server 130 includes an authentication module 132 that implements the framework as discussed herein. In particular, the authentication module 132 may generate or otherwise access the blockchain 150 for establishing and managing platform independent personal profiles for various users according to various embodiments of the disclosure. In some embodiments, the authentication module 132 may collaborate with other servers of different third-party identity verification service providers (e.g., the identity verification servers 120 and 170, etc.) and various verifier devices 180 and 190 to perform functionalities related to authenticating users, establishing, managing, and maintaining personal profiles of various users. By using the framework as discussed herein, any user who has registered with the service provider server 130 may be authenticated by any verifier devices, regardless which backend identity verification services are used by the verifier devices. The functionalities performed by the authentication module 132 and/or the other servers are described in more details in FIGS. 5-7.

Figure 2:
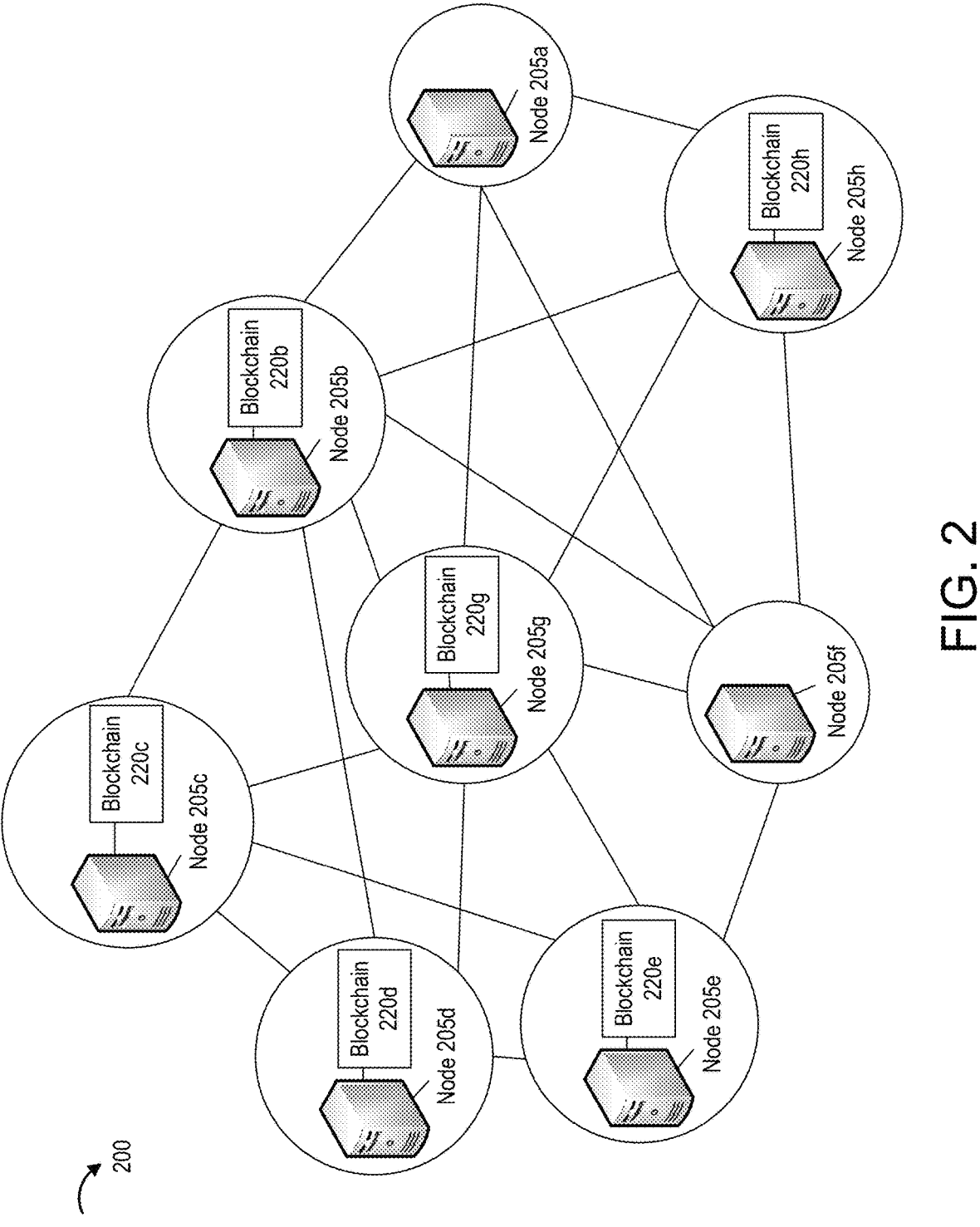
FIG. 2 illustrates an example blockchain network according to an embodiment of the present disclosure.

FIG. 2 shows an example blockchain network 200 comprising a plurality of interconnected nodes or devices 205*a-h* (generally referred to as nodes 205). Each of the nodes 205 may comprise a computing device 800 described in more detail with reference to FIG. 8. In some embodiments, each of the nodes may correspond to a server that is designated to access and/or maintain the personal profiles of users according to various embodiments of the disclosure. For example, the service provider server 130 may be one of the nodes 205. In addition, each of the servers (e.g., the identity verification servers 120 and 170) correspond to third-party identity verification platforms may also be nodes 205 as part of the blockchain network 200. The blockchain network 200 may be associated with a blockchain 220, which may correspond to the blockchain 150. Some or all of the nodes 205 may replicate and save an identical copy of the blockchain 220. For example, FIG. 2 shows that the nodes 205b-e and 205g-h store copies of the blockchain 220. The nodes 205b-e and 205g-h may independently update their respective copies of the blockchain 220 as discussed below.

Figure 3:
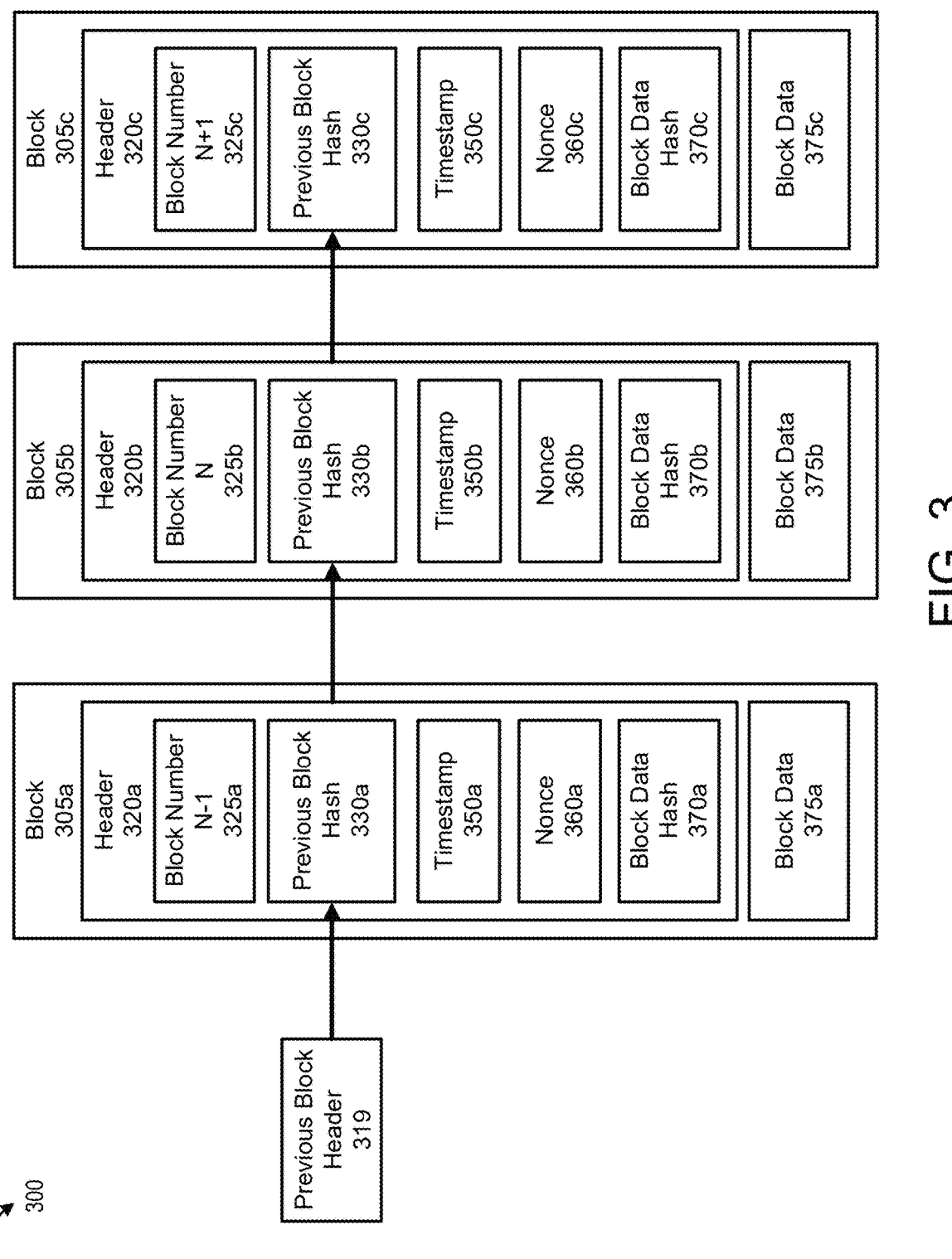
FIG. 3 illustrates an example blockchain according to an embodiment of the present disclosure.

FIG. 3 shows an example blockchain 300. The blockchain 300 may comprise a plurality of blocks 305a, 305b, and 305c (generally referred to as blocks 305). The blockchain 300 comprises a first block (not shown), sometimes referred to as the genesis block. Each of the blocks 305 may comprise a record of one or a plurality of submitted and validated transactions. Each of the blocks 305 may comprise one or more data fields. The organization of the blocks 305 within the blockchain 300 and the corresponding data fields may be implementation specific. As an example, the blocks 305 may comprise a respective header 320a, 320b, and 320c (generally referred to as headers 320) and block data 375a, 375b, and 375c (generally referred to as block data 375). The headers 320 may comprise metadata associated with their respective blocks 305. For example, the headers 320 may comprise a respective block number 325a, 325b, and 325c. As shown in FIG. 3, the block number 325a of the block 305a is N−1, the block number 325b of the block 305b is N, and the block number 325c of the block 305c is N+1. The headers 320 of the blocks 305 may include a data field comprising a block size (not shown).

The blocks 305 may be linked together and cryptographically secured. For example, the header 320b of the block N (block 305b) includes a data field (previous block hash 330b) comprising a hash representation of the previous block N−1's header 320a. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 320c of the block N+1 (block 305c) includes a data field (previous block hash 330c) comprising a hash representation of block N's (block 305b) header 320b.

The headers 320 of the blocks 305 may also include data fields comprising a hash representation of the block data, such as the block data hash 370a-c. The block data hash 370a-c may be generated, for example, by a Merkle tree and by storing the hash or by using a hash that is based on all of the block data. The headers 320 of the blocks 305 may comprise a respective nonce 360a, 360b, and 360c. In some implementations, the value of the nonce 360a-c is an arbitrary string that is concatenated with (or appended to) the hash of the block. The headers 320 may comprise other data, such as a difficulty target.

The blocks 305 may comprise a respective block data 375a, 375b, and 375c (generally referred to as block data 375). The block data 375 may comprise a record of validated transactions that have also been integrated into the blockchain 200 via a consensus model (described below). As discussed above, the block data 375 may include a variety of different types of data in addition to validated transactions.

Block data 375 may include any data, such as text, audio, video, image, or file, that may be represented digitally and stored electronically.

Figure 4:
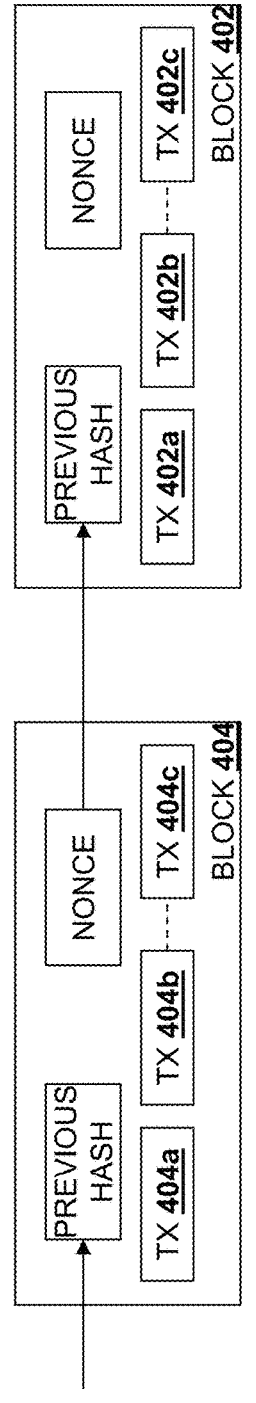
FIG. 4 is a schematic view illustrating a token transaction ledger according to an embodiment of the present disclosure.

FIG. 4 illustrates an example ledger 400 according to one embodiment of the disclosure. The ledger 400 may correspond to a blockchain that is maintained and managed by a network (comprising a network of computer nodes 200 as shown in FIG. 2). When a record is processed by any one of the computer nodes (e.g., the server 120 adding an interaction or transaction of a user to the blockchain 150, etc.), the record is stored in a block that is added to the ledger 400 by the computer node. To produce the ledger 400, a single device (e.g., the service provider server 130, the server 120, etc.) or a distributed network of devices may operate to agree on a single history of records. Each device in the distributed network operates to collect new records into a block, and then to increment a proof-of work system that includes determining a value that when hashed with the block provides a required number of zero bits.

For example, for a block 402 that includes a plurality of records 402a, 402b, and up to 402c, a device in the distributed network may increment a nonce in the block 402 until a value is found that gives a hash of the block 402 the required number of zero bits. The device may then "chain" the block 402 to the previous block 404 (which may have been "chained" to a previous block, not illustrated, in the same manner).

FIG. 5 illustrates a process 500 for establishing a platform independent personal profile for a user according to various embodiments of the disclosure. The process 500 may be performed by the authentication module 132 of the service provider server 130. The process 500 begins by receiving (at step 505), from a user device, a request to establish a universal personal profile. For example, the authentication module 132 may receive a request from the user device 110 indicating a desire of the user 140 to establish a universal personal profile.

The process 500 then obtains (at step 510) authentication data from the user and registers (at step 515) the user with one or more third-party platforms using the authentication data. In some embodiments, the authentication module 132 may provide a user interface on the user device 110 for obtaining the authentication data. The authentication data may include information associated with an identification document (such as a government issued document, e.g., a driver's license, a passport, etc.) and biometric data (e.g., a photo of a face of the user 140, a fingerprint scan of the user 140, voice data, electrocardiogram (ECG) data of the user 140, an iris scan of the user 140, etc.). As such, the authentication module 132 may activate one or more sensors (e.g. image sensors, electromagnetic sensors, etc.) of the user device 110, and instruct the sensors to capture one or more images of the identification document and the biometric data of the user 140. In some embodiments, the authentication module 132 may register the user 140 with various third-party identity verification platforms, for example, by transmitting corresponding application programming interface (API) calls to the identification verification server 120 and the identification verification server 170. In some embodiments, the authentication module 132 may determine a particular protocol for communicating with each of the identification verification server 120 and the identification verification server 170, and may use the determined protocol to communicate with the corresponding identification verification server to register the user.

The process 500 also encodes (at step 520) the authentication data and generates (at step 525) a unique token associated with a blockchain for the user. For example, the authentication module 132 may encode the information associated with the identification document into an encoded code using one or more encoding techniques (e.g., a Base64 encoding technique, etc.). In some embodiments, the authentication module 132 may also generate a token (or cause the token to be minted by one or more computer nodes associated with a blockchain) for the user. The token may be unique within the blockchain environment, and may represent the user in subsequent transactions (e.g., authentication transactions, login transactions, access transactions, etc.). In some embodiments, the token can be associated with one or more profiles of the user that can be used by multiple different platforms for tracking activities of the user. In some embodiments, in order to enhance security of the authentication process for the user, the authentication module 132 may also generate a digital signature for the user. The digital signature may be generated using the techniques disclosed herein, for example, by encrypting the encoded data using a private key assigned to the user. In some embodiments, the authentication module 132 may also encrypt a counter along with the encoded data to generate the digital signature. The counter may be changed (e.g., incremented) each time the user has been authenticated such that the digital signature can be changed each time.

The process 500 then stores (at step 530) the authentication data on the blockchain in association with the token and stores (at step 535) the token and the encoded authentication data in a wallet application of a user device. For example, after generating the token for the user, the authentication module 132 may create a record that includes the encoded authentication data and optionally other information (e.g., the digital signature, a public key assigned to the user 140 (corresponding to the private key used to generate the digital signature), etc.) associated with the user, and may store the record on the blockchain in association with the token. In some embodiments, the authentication module 132 may also store the token, the encoded authentication data, and the digital signature in the wallet application 116 (e.g., Apple Pay®, Google Pay®, etc.) of the user device 110. For example, the wallet application 116 may create a new digital object, and may the data associated with the user 140 in the new digital object. After establishing a universal personal profile for the user, the user can be authenticated with different verifier devices (e.g., verifier devices 180, 190, etc.).

FIG. 6 illustrates a process 600 for authenticating a user according to various embodiments of the disclosure. The process 600 may be performed by the authentication module 132 in cooperation with a verifier device and/or any an identity verification server associated with a third-party platform. The process 600 begins by receiving (at step 605), from a device, a request for authenticating a user and obtaining (at step 610) user identification data of the user from the device. For example, the user 140 may desire to access a physical area (e.g., a facility, a country, etc.), an electronic service (e.g., logging on to an account with an online service provider, etc.), a service from an appliance. A verifier device (e.g., the verifier device 180, the verifier device 190, etc.) may require the user 140 to be authenticated (e.g., to ensure that the user 140 is the person he/she claims to be, who has the proper attributes, such as a proper clearance, a proper age, etc.) before providing access to the user 140. As such, the user 140 may use the user device 140 (or the verifier device) to initiate an authentication process with the user. For example, the user 140 may initiate the authentication process by interacting with the verifier device or by tapping the user device 110 on the verifier device. The verifier device may then transmit an authentication request to the authentication module 132. Upon receiving the authentication request, the authentication module 132 may cause the verifier device to establish a connection (e.g., a near-field communication connection, etc.) with the user device 110 according to the communication protocol associated with the wallet application 116, and may cause the verifier device to retrieve the authentication data from the user device 110 via the connection. The authentication data may include a token associated with a universal personal profile of the user 140, encoded data representing an identification document of the user 140, and a digital signature.

The process 600 then captures (at step 615) biometric data of the user. For example, the authentication module 132 may cause the verifier device to activate a sensor to capture biometric data of the user 140 as part of the authentication process.

The process 600 also determines (at step 620) that the biometric data corresponds to an identification document of the user, verifies (at step 625) that the user is registered with a credential issuer based on a record on a blockchain that corresponds to the token, and verifies (at step 630) the authenticity of the user identification data. For example, the authentication module 132 may use the token obtains from the user device 110 to access one or more records in the blockchain. The authentication module 132 may retrieve encoded data and a public key that is stored on one of the records in association with the token. The authentication module 132 may determine that the user is registered with the service provider server 130 (which is a credential issuer) if a record including the encoded data and the public key in association with the token exists in the blockchain.

In some embodiments, the authentication module 132 may access the identification document associated with the encoded data received from the user device 110 by decrypting the encoded data using the public key. The authentication module 132 may compare the identification document against data associated with the encoded data retrieved from the blockchain and determine if they match. The authentication module 132 may determine that the encoded data received from the user device 110 corresponds to the same user associated with the token if the two match. In some embodiments, the authentication module 132 may also determine whether the biometric data captured by the verifier device matches the biometric data included in the encoded data.

In addition, the authentication module 132 may also verify the authenticity of the digital signature by using the public key to decrypt the digital signature and comparing the decrypted digital signature against the encoded data.

After verifying the authenticity of the authentication data associated with the user, the process performs (at step 635) an action for the user. For example, the authentication module 132 may transmit an authentication success signal to the verifier device. The verifier device may provide the user 140 access to a desired location and/or service. For example, the verifier device may send a signal to a barrier and cause the barrier to open for the user 140. In another example, the verifier device may send a signal to an appliance to unlock the appliance. In yet another example, the verifier device may send a signal to a computer system to enable the user to access services associated with the computer system (e.g., a website, etc.).

Use Case: Hospital Verifying Visitor Identity Using Apple Wallet

Scenario: A visitor (credential holder who has previously registered with the service provider server) arrives at a hospital and needs to verify his/her identity upon entry. The visitor has previously registered with at least one identify verification provider, and has their identity credentials stored in their Apple Wallet of a device. The hospital uses an NFC reader to verify the visitor's identity.

Step-by-Step Process:

1. Visitor Registration with the Service Provider Server:

The visitor goes through a registration process with service provider server prior to hospital visit, where their biometric data (e.g., facial recognition) and a state-issued ID are captured.

Via a third-party identity verification provider, the service provider server verifies the visitor's identity and generates a token (also referred to as "distributed identifier" or "DID") for them.

The third-party identity verification provider or the service provider server creates a base64-encoded payload containing the visitor's verified identity information (e.g., full name, date of birth, ID number) that is extracted via an API of the third-party identity verification provider.

Service provider server signs the hash of this payload with their private key to create a digital signature.

The DID, base64-encoded payload, and digital signature are stored in the visitor's Apple Wallet as a pass.

2. Credential Storage in Apple Wallet:

The visitor's Apple Wallet pass includes: (a) DID: 'did:clear:123456789abcdefghi', (b) Base64-encoded payload: 'eyJmdWxsTmFtZSI6ICJKb2huIERvZSIsICJk YXRlIT2ZCaXJ0aCI6ICIxOTkwLTAxLTAxliwg ImlETnVtYmV yIjogIkQxMjM0NTY3In0=' and (c) Digital signature: 'generated_signature'

3. Visitor Enters Hospital:

Upon arrival at the hospital, the visitor taps their iPhone with the Apple Wallet pass on an NFC reader at the entry point.

4. NFC Reader Interaction:

The NFC reader retrieves the DID, base64-encoded payload, and digital signature from the visitor's Apple Wallet pass.—The reader sends this data to the hospital's verification system.

5. Verification Process:

The hospital's verification system performs the following steps:

a. Retrieve IIDV's Public Key:

The hospital's system retrieves the public key of the user from a trusted directory or decentralized ledger.

b. Verify the Digital Signature:

The system uses IIDV's public key to verify the digital signature.

It calculates the hash of the base64-encoded payload and checks if it matches the signed hash.

If the signature is valid, it confirms that the data has not been tampered with.

c. Check Data Integrity:

The system computes the hash of the presented base64-encoded payload.

It compares this hash with the hash stored on the decentralized ledger to ensure data integrity.

d. Biometric Verification (Optional):

If additional verification is needed, the system can challenge the visitor to provide biometric data.

The system sends this data to the third-party identity verification platform via API to verify against the stored biometric data.

6. **Access Decision

If all verification steps are successful, the hospital's system grants the visitor access.

If any step fails, access is denied, and appropriate fallback or security protocols are followed.

In the example where the hospital uses an NFC reader to verify a visitor's identity with credentials issued by the service provider server and stored in the visitor's Apple Wallet, the hospital does not need to see the decoded base64 of the user ID directly. Instead, the hospital's verification system (a verifier device) can use cryptographic methods to verify the authenticity and integrity of the credential without accessing the actual personal data contained within the base64-encoded payload, which enhances the privacy of personal data of the users.

FIG. 7 illustrates a process 700 for adding interaction and/or transaction data associated with a user to a corresponding personal profile according to various embodiments of the disclosure. The process 700 may be performed by the authentication module 132 and/or any of the servers associated with third-party platforms. In some embodiments, after authenticating a user using the techniques disclosed here, a server associated with a third-party platform may access the blockchain 150 to obtain and/or generate a personal profile of the user based on the records stored on the blockchain 150 and associated with the user. Based on the personal profile of the user, the server may provide enhanced user interface elements and/or user interactions for the user via the corresponding platform. The process 700 begins by accessing (at step 705) a unique token generated for the user. For example, after authenticating the user 140 using the process 600, the authentication module 132 and/or the verifier device may transmit the token of the user to a computer system that provides data and/or services to the user 140.

The process 700 then retrieves (at step 710) a session token in association with a session between the user and a third-party user interface and generates (at step 715) a token to represent the session for the user based on the session token and the unique token. For example, the computer system may establish a session (e.g., an online session, a web session, etc.) with the user device 110 based on the authentication of the user 140. The computer system may provide data and/or services to the user 140 during the session. In some embodiments, the computer system may assign a session token (e.g., a session identifier, etc.) to the session established with the user device 110 for uniquely identifying the session with the user 140. The computer system may generate a token (a combined token) based on the session token and the unique token associated with the user. For example, the combined token may be generated by combining and/or merging the session token with the unique token. The combined token may universally represent the session between the computer system and the user 140 on the blockchain (e.g., across different computer systems and/or platforms).

In some embodiments, the computer system may also use the unique token associated with the user to access one or more records stored in the blockchain. The records may be part of the universal personal profile of the user 140 and may include information that represents the user 140 prior interactions with the computer system or other computer systems. Based on the records, the computer system may adjust the data, the services, and/or functionality that the user 140 can access. For example, if the user 140 has a transaction history with one or more computer system for longer than a threshold period, the computer system may determine that the user 140 is a trustworthy user, and may enable the user 140 to access additional data/services/functionality (e.g., can access more data, is shown as a verified user on the user interface of the computer system, of the computer system. On the other hand, if the user 140 has a short transaction history, or the transaction history of the user 140 indicates suspicious behavior (e.g., fraudulent transactions, offensive posts shared by the user 140 on a social media platform, etc.), the computer system may restrict the user 140 from accessing certain data/services/functionality of the computer system.

The process 700 monitors (at step 720) activities associated with the session and adds (at step 725) session data to the blockchain in association with the token. For example, the computer system may monitor interactions between the user 140 and the computer system (e.g., the webpages that the user 140 browses, items and/or data that the user 140 accesses and views, items or services that the user 140 purchases, posts and/or other information, such as multimedia items that the user 140 shares, etc.). The computer system may generate a record based on the monitored interactions, and may add the record to the blockchain in association in association with the unique token associated with the user 140. The record may be included as part of the universal personal profile of the user 140. This way, the computer system or other computer systems may subsequently use the record (and other records associated with the user 140 that is stored on the blockchain) to provide services to the user 140.

Figure 8:
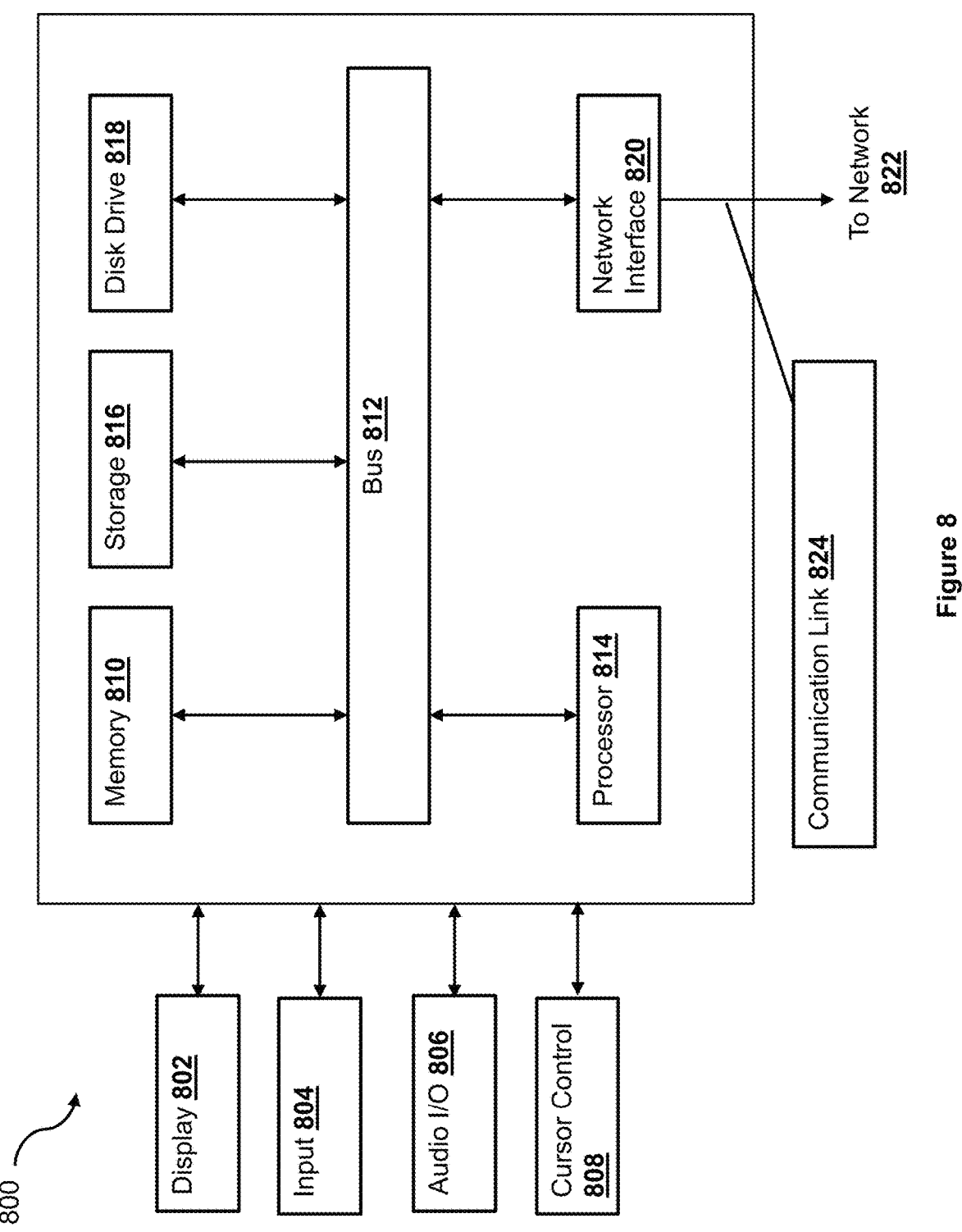
FIG. 8 is a block diagram of a system for implementing a device according to an embodiment of the present disclosure.

FIG. 8 is a block diagram of a computer system 800 suitable for implementing one or more embodiments of the present disclosure, including the service provider server 130, the identity verification servers 120 and 170, the verifier devices 180 and 190, and the user device 110. In various implementations, each of the devices 110, 180, and 190 may include a mobile cellular phone, a tablet, personal computer (PC), laptop, wearable computing device, etc. adapted for wireless communication, and each of the service provider server 130 and the identity verification servers 120 and 170 may include a network computing device, such as a server. Thus, it should be appreciated that the devices/servers 110, 120, 130, 170, 180, and 190 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account or a checkout page for purchasing an item from a merchant. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via a network 822, such as network

160 of FIG. 1. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid-state drive, a hard drive). The computer system 800 performs specific operations by the processor 814 and other components by executing one or more sequences of instructions contained in the system memory component 810. For example, the processor 814 can perform the cryptocurrency transactions functionalities described herein.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:

a non-transitory memory; and one or more hardware processors coupled with the non-transitory memory and configured to read instructions from the non-transitory memory to cause the system to perform operations comprising:

receiving, via an application of a first device, a first user authentication request;

retrieving, via a communication channel between the first device and a second device of a user, user identification data, wherein the user identification data comprises a universal identifier, a digital signature, and encoded data representing information associated with an identification document;

capturing, using the first device or the second device, biometric data of the user;

determining that the biometric data corresponds to the identification document based on transmitting an application programming interface (API) call to a server of an identity verification provider;

verifying that the user is registered with a credential issuer based on locating a first record on a blockchain using the universal identifier;

retrieving, from the blockchain and using the universal identifier, a public key associated with the user and a second record associated with a second user authentication request previously conducted by the user;

determining that the first user authentication request is inconsistent with the second user authentication request based on the second record;

in response to the determining that the first authentication request is inconsistent with the second authentication request, transmitting a challenge to the second device via the communication channel, wherein the challenge comprises seed data;

receiving, via the communication channel, a response to the challenge from the second device;

verifying the response using the public key associated with the user;

verifying an authenticity of the user identification data based on the public key, the digital signature, and the second record; and providing, to the application of the first device, an approval to the first user authentication request based on the verifying.

2. The system of claim 1, wherein the operations further comprise:

extracting the information associated with the identification document based on decoding the encoded data.

3. The system of claim 1, wherein the operations further comprise:

enabling the user to access a physical area based on the approval to the first user authentication request.

4. The system of claim 1, wherein the operations further comprise:

enabling the user to access a service based on the approval to the first user authentication request.

5. The system of claim 1, wherein the operations further comprise:

prior to the receiving the first user authentication request, capturing, via the second device, second biometric data associated with the user and one or more images of the identification document;

registering the user with the identity verification provider using the second biometric data and the one or more images;

generating a token associated with the blockchain for the user, wherein the token corresponds to the universal identifier; and generating the encoded data based on encoding the information associated with the identification document.

6. The system of claim 5, wherein the identity verification provider is a first identity verification provider, and wherein the operations further comprise:

registering the user with the second identity verification provider using the second biometric data and the one or more images.

7. The system of claim 5, wherein the operations further comprise:

storing the universal identifier and the encoded data in a wallet application of the second device.

8. The system of claim 5, wherein the operations further comprise:

generating, for the user, a private key that corresponds to the public key; and generating the digital signature based on encrypting the encoded data using the private key.

9. The system of claim 1, wherein the operations further comprise:

unlocking a physical barrier based on the approval to the first user authentication request.

10. The system of claim 1, wherein the operations further comprise:

opening a door based on the approval to the first user authentication request.

11. A method comprising:

receiving, by a computer system associated with a credential issuer, a first user authentication request via an application of a first device;

retrieving, by the computer system, user identification data of a user that is transmitted via a communication channel between the first device and a second device, wherein the user identification data comprises a token associated with a blockchain, a digital signature, and encoded data representing information associated with an identification document;

capturing, via the first device or the second device, biometric data of the user;

determining, by the computer system, that the biometric data corresponds to the identification document based on a result from an application programming interface (API) call transmitted to a server of an identity verification provider;

verifying, by the computer system, that the user is registered with the credential issuer based on locating a first record on the blockchain using the token;

retrieving, from the blockchain and using the token, a public key associated with the user and a second record associated with a second user authentication request previously processed for the user;

determining, by the computer system, that the first user authentication request is inconsistent with the second user authentication request based on the second record;

in response to the determining that the first authentication request is inconsistent with the second authentication request, transmitting, by the computer system, a challenge to the second device via the communication channel, wherein the challenge comprises seed data;

receiving, via the communication channel, a response to the challenge from the second device;

verifying, by the computer system, the response using the public key associated with the user;

verifying, by the computer system, an authenticity of the user identification data based on the public key, the digital signature, and the second record; and providing, to the application of the first device, an approval to the user authentication request based on the verifying.

12. The method of claim 11, further comprising:

extracting the information associated with the identification document based on decoding the encoded data.

13. The method of claim 11, further comprising:

unlocking a gate for a physical area based on the approval to the first user authentication request.

14. The method of claim 11, further comprising:

enabling the user to access an electronic service based on the approval to the first user authentication request.

15. The method of claim 11, further comprising:

prior to the receiving the first user authentication request, capturing, via the first device or the second device, second biometric data associated with the user and one or more images of the identification document;

registering the user with the identity verification provider using the second biometric data and the one or more images;

generating the token associated with the blockchain for the user; and generating the encoded data based on encoding the information associated with the identification document.

16. The method of claim 15, wherein the identity verification provider is a first identity verification provider, and wherein the method further comprises:

registering the user with the second identity verification provider using the second biometric data and the one or more images.

17. The method of claim 15, further comprising:

storing the token and the encoded data in a wallet application of the second device.

18. The method of claim 15, further comprising:

generating, for the user, a private key that corresponds to the public key; and generating the digital signature based on encrypting the encoded data using the private key.

19. The method of claim 11, further comprising:

unlocking a physical barrier based on the approval to the first user authentication request.

20. The method of claim 11, further comprising:

opening a door based on the approval to the first user authentication request.

* * * * *